UNITED STATES PATENT OFFICE.

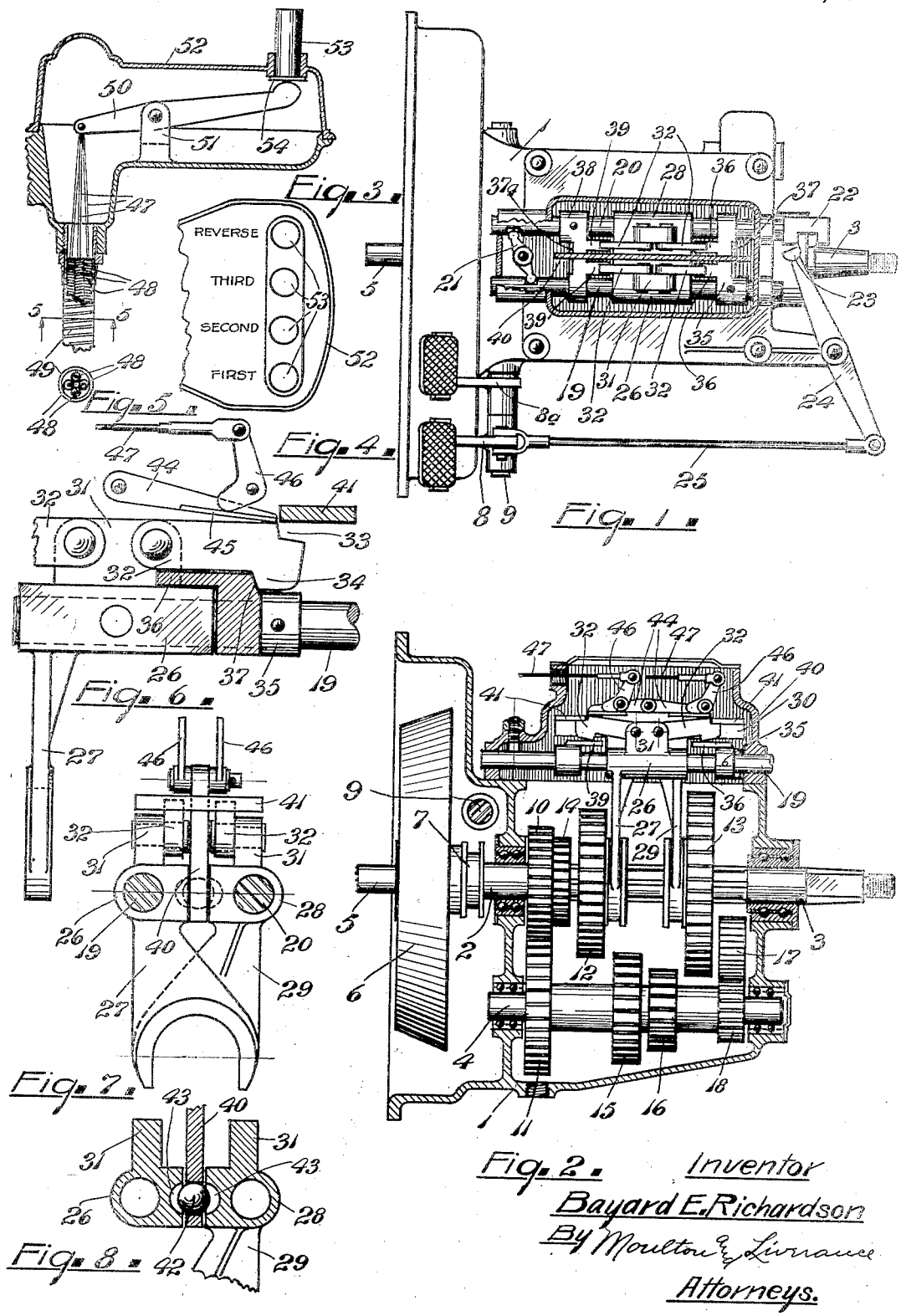

BAYARD E. RICHARDSON, OF GRAND RAPIDS, MICHIGAN, ASSIGNOR TO MECHANO GEAR SHIFT COMPANY, OF GRAND RAPIDS, MICHIGAN, A CORPORATION OF MICHIGAN.

GEAR-SHIFT.

1,329,798.  Specification of Letters Patent.  Patented Feb. 3, 1920.

Application filed July 24, 1917. Serial No. 182,442.

*To all whom it may concern:*

Be it known that I, BAYARD E. RICHARDSON, a citizen of the United States of America, residing at Grand Rapids, in the county of Kent and State of Michigan, have invented certain new and useful Improvements in Gear-Shifts; and I do hereby declare the following to be a full, clear, and exact description of the invention, such as will enable others skilled in the art to which it appertains to make and use the same.

This invention relates to mechanism for effecting the ready shifting of gears in sliding gear transmissions, it being especially adapted for application to motor vehicles. It is an object and purpose of the invention to provide a simply constructed and effected device of this character in which, after selection of a desired shift of gears, the neutralization of the gearing is effected on forward operation of a clutch pedal controlling the connection of the motive power to a shaft which in turn drives the rear wheels of the vehicle, while the selected shift of gears is accomplished on the return of the clutch pedal to its normal driving position. The invention also contemplates many novel and improved constructions and arrangements of parts for attaining these and other desired ends not specifically enumerated, but which will fully appear as the description of my preferred embodiment of the invention is understood, reference being had to the accompanying drawing showing the same, in which:

Figure 1 is a partial plan and sectional view of a sliding gear transmission equipped with my invention.

Fig. 2 is a vertical section therethrough.

Fig. 3 is a vertical section illustrating the manually operable portion of the selecting mechanism.

Fig. 4 is a fragmentary plan view of the rear part of the housing of the selecting mechanism shown in Fig. 3.

Fig. 5 is a section taken on the line 5—5 of Fig. 3.

Fig. 6 is a fragmentary side elevation, somewhat enlarged, showing the operation, with the gear casing, for selecting a desired shift of gearing.

Fig. 7 is an end elevation of the mechanism mounted above the sliding gear transmission and showing the shifting elements and selector elements associated therewith and, Fig. 8 is a detail in vertical section illustrating the locking means used for holding one of the sliding yokes in central neutral position when the other is moved away from such position.

Like reference characters refer to like parts in the different views of the drawings.

The sliding gear transmission is located within a casing or housing 1, it also covering the clutch and having mounted therein a driving shaft 2, in alinement with which is a driven shaft 3. There is also included in the construction a jack or counter shaft 4 positioned below the driven shaft. A fragmentary section of the engine shaft 5 is disclosed in the drawings to which one member 6 of a clutch is secured, the opposite member engaging therewith, being controlled in the usual manner by an operative connection between collar 7 slidably mounted on the driving shaft 2 and a clutch pedal 8 which is fixed to a rock shaft 9. The mechanism described is all of standard construction, the clutch pedal being used to disconnect the crank shaft from the driving shaft on forward movement thereof as is well understood.

A gear 10 is secured at the rear end of the driving shaft 2 and is in mesh with a gear 11 on the front end of the jack shaft 4. Two gears 12 and 13 are splined on the drive shaft 3, the former of which is adapted to be moved forward to connect with a clutch element 14 integral with or secured to the gear 10 or to be moved to another position to the rear to mesh with a gear 15 on the jack shaft. Likewise gear 13 is movable to two extreme positions to engage either with the gear 16 on the jack shaft or with an idle pinion 17 which is in mesh with a gear 18 fixed at the rear end of the jack shaft. The gearing described is of well known type and construction for securing three speeds forward and one reverse as between the driving and driven shafts.

Directly above the transmission gearing two horizontal rods 19 and 20 are slidably mounted. These rods are spaced a short distance apart and adjacent their front ends are provided with notches on their inner sides in which rounded ends of a lever 21 pivotally mounted midway between its ends seat, whereby on movement of a rod in one direction the other rod is given an equal but opposite movement. A head 22 is fixed on the rear end of rod 20 having notch or opening in one side adapted to receive a head 23 on the free end of a lever 24 pivotally mounted between its ends on the transmission casing 1 as shown. A rod 25 is connected at its forward end to the clutch pedal 8 and at its rear end to the other end of the lever 24. It will be noted that normally as shown in Figs. 1 and 2, the head 23 is disassociated from head 22 and that on forward movement of the clutch pedal there is no engagement of heads 23 and 22 until after such time as the clutch has been fully engaged, ordinary operation of the clutch in no respect interfering with the gearing.

A sleeve 26 is slidably mounted upon rod 19 from which depends a yoke 27 adapted to have operative connection with the sliding gear 12. Similarly, a sleeve 28 is slidably mounted upon rod 20 it having a depending yoke 29 operatively engaged with the sliding gear 13. The rods 19 and 20 are slidably mounted at their ends in the ends of a cover 30 to the gear casing. This cover also incloses a part of the selector mechanism and the various parts and elements of the gear shift mechanism associated with said sleeves and yokes.

From each of the sleeves 26 an integral lug or ear 31 projects upwardly to each of which two oppositely extending dogs 32 are pivotally connected. These dogs are of special formation with a notch such as indicated at 33 in the upper corners of the free ends of said dogs and also with a downwardly extending lip 34 which has an inclined face as shown. A member 35 is pinned to and adjacent the rear end of rod 19 within cover 30, and extends across to and slidably mounted upon the rod 20. From this member two fingers 36 project forward under the dogs 32 which extend to the rear from ears 31. The member 35 at its rear edge between rods 19 and 20 is fashioned with a downwardly and rearwardly inclined face 37 with which the forwardly inclined faces of lips 34 of the rearwardly extending dogs 32 are adapted at times to engage. A second member 38 as pinned to the rod 20 adjacent the forward portion of the housing 30, it extending across and between the rods and having slidable engagement with the rod 19. It has two rearwardly extending fingers 39 similar to the fingers 36 heretofore described, and likewise extending under the forwardly extending dogs 32. Member 38 is likewise formed with an inclined face 37ª similar in substantially all respects to the face 37 previously described. A vertical plate 40, at its end provided with lateral extensions 41, as secured in the casing, said plate passing downwardly between the sleeves 26 and 28. An opening is made through the vertical plate 40 in which a ball 42 is seated, and midway between the ends of sleeves 26 and 28 semi-spherical recesses 43 are made which, when the gearing is at neutral position, come directly opposite each other and in direct conjunction with the ball 42 whereby on movement of either sleeve away from its middle neutral position the ball is forced into the recess of the opposite sleeve holding it firmly against movement.

Four members 44 are pivotally connected to the plate 40 adjacent its upper edge and midway between its ends, two on each side of the plate, each pair on each side of the plate extending in opposite directions. Each member 44 is provided with a lateral horizontal lip 45 against which one arm of a bell crank lever 46 is adapted to bear. The ends of the members 44 lie against the upper sides of the dogs 32 and come just within the edges of the lateral extension 41 to the central plate 40. There are four of the bell crank levers 46 from the upwardly extending arms of which wires 47 project forward through an opening in the front side of cover 30 leading therefrom to the immediate selector mechanism. The wires 47 are housed within flexible metallic or coiled wire covers 48 all of which in turn are housed within a flexible steel tubing 49 which leads to and is secured to the housing of the immediate selector mechanism which, preferably, will be located at some convenient place for access by the hand of the driver of the motor vehicle. In practice this housing is usually located on the steering wheel of the vehicle. Wires 47 are at their upper ends, connected to the ends of levers 50 pivotally mounted between their ends on post 51 located within the housing 52 to which reference has heretofore been made. Four cylindrical push buttons 53 are loosely mounted in guides formed in the cover to the housing and are provided with heads 54 of larger diameter which rest against the rear ends of the levers 50. The heads 54 preclude the passage of the buttons 53 upwardly through the housing.

The operation of the mechanism will now be described. With the gearing in neutral, sleeves 26 and 28 and attached parts are located as shown in Figs. 1 and 2, the fingers 36 elevating dogs 32 to the position shown. Notches 33 formed in the dogs permit the elevation thereof which would otherwise be stopped by the lateral sections 41 of plate 40. If it is desired to secure a certain connection of gear, the clutch pedal is actuated thereby first disconnecting the clutch and afterward engaging the head 23 of lever 24 with the head 22 on rod 20, this causing members 35 and 38 to move toward the sleeves 26 and 28 to a position substantially indicated in Fig. 6, whereupon the buttons for the selected speed may be depressed, this pulling on the associated wire 47 and through its connected bell crank lever 46 and associated member 44 depressing a dog 32 whereby the lip 34 thereon comes into engagement with the inclined shoulder 37 or 37ᵃ of one of the members 35 or 38. On return of the clutch pedal, rods 19 and 20 are moved to their normal position such as show in Figs. 1 and 2, and the dog which has been depressed is pulled under the adjacent part 41, the connected sleeve and yoke being carried therewith so as to effect the desired engagement of the gears. At the same time it will be noted that the friction of the collar 48 on the wire 47 serves to hold it against return and the speed selected and secured as a consequence is indicated by a depressed button 53. To shift to another speed the clutch pedal is again actuated first to disengage the clutch followed by a continued forward movement of the clutch pedal for operation of the rods 20 and 19 so as to bring the members 35 and 38 toward each other whereupon a sleeve 26 or 28 which has been moved from its central neutral position is forced to neutral. The button for the new speed selected is then depressed as before and the desired gear change made as before. It will be noted that the selector mechanism first operated for the first gear connection remains in the position to which it was operated during this movement but that on the return of the clutch pedal the first dog 32 that was depressed is elevated by movement of the member either 35 or 38 associated therewith thereby actuating the bell crank lever 46 associated with which and pulling the connected wire 47 back to former position, this elevating the selector button which was first depressed. The mechanism, accordingly, in operation indicates the gear connection which is working and as soon as another gear connection is effected, automatically forces the first selector button upwardly to its normal position leaving only the button which is associated with the gear connection actually in the operation depressed.

The construction described is very simple in structure and may be very economically produced. In this construction it will be noted that there are no springs of any character used. This mechanism has been used practically and is very effective in operation, the shifting of gears being readily and easily obtained thereby. Many changes in constructive detail may be resorted to without departing from my invention and I do not wish to be limited to the specific construction shown, but consider myself entitled to all modifications of structure falling within the scope of the appended claims defining the invention.

I claim:—

1. In a mechanism of the character described, a gear transmission including a plurality of shiftable gears, a pair of rods slidably mounted adjacent the gears, a shifting element slidably mounted on each rod and connected each to a shiftable gear, means for simultaneously reciprocating said rods in opposite directions and members fixed one to each rod and movable toward each other to engage with said shifting elements on the first reciprocatory movement of said rods to thereby bring both shifting elements to central neutral position, substantially as described.

2. In a mechanism of the character described, a gear transmission including a plurality of shiftable gears, a pair of rods slidably mounted adjacent the gears, a shifting element slidably mounted on each rod and connected each to a shiftable gear, means for simultaneously reciprocating said rods in opposite directions, a member fixed one on each rod, said members being moved toward each other on the first reciprocatory movement of said rods and engaging the shifting elements to bring both to central neutral position, and means to selectively engage either of said shifting elements with either of said members fixed to said rods to thereby effect a shift of gearing on a succeeding reciprocatory movement of said rods.

3. In a mechanism of the character described, a gear transmission including a plurality of shiftable gears, a pair of rods slidably mounted adjacent the gears, a shifting element slidably mounted on each rod, and connected each to a shiftable gear, a foot pedal, operative means between the pedal and rods for reciprocating said rods in opposite directions with forward and return movements of the pedal, and a member connected to each rod adapted to engage with said shifting elements on the first reciprocatory movement of said rods to thereby bring both shifting elements to central neutral position, substantially as described.

4. In a mechanism of the character described, a gear transmission including a plurality of shiftable gears, a pair of rods slidably mounted adjacent the gears, a shifting element slidably mounted on each rod, and connected each to a shiftable gear, a pivotally mounted pedal, a lever pivotally mounted between its ends, a rod connecting one end of the lever with the pedal, operative connections between said rods at one end whereby when one rod is moved in one direction, the other rod is moved in the opposite direction, one of said rods at the opposite end having a head provided with a recess in one side thereof into which the free end of said lever is adapted to enter to engage with the head on operation of the pedal, and a member connected to each rod adapted to engage with said shifting elements on the first reciprocatory movement of said rods to thereby bring both shifting elements to central neutral position, substantially as described.

5. In a mechanism of the character described, a gear transmission including a plurality of shiftable gears, a pair of rods slidably mounted adjacent the gears, a shifting element slidably mounted on each rod and connected each to a shiftable gear, means for simultaneously reciprocating said rods in opposite directions, members fixed one to each rod and movable toward each other to engage against said shifting elements on the first reciprocatory movement of said rods to thereby bring both shifting elements to central neutral position, each of said shifting elements being provided with an upstanding ear, and two dogs mounted on each ear and extending in opposite directions, said dogs being adapted for selective engagement with said members secured to the rods.

6. A mechanism containing the elements in combination claimed in claim 5 combined with fingers on each member extending under adjacent dogs, substantially as described.

7. A mechanism containing the elements claimed in combination in claim 5, combined with means on each member normally extending under and elevating adjacent dogs, and means to selectively depress any desired dog to engage with its associated member when said members have been moved toward each other on the first reciprocatory movement of said rods, thereby rendering said elevating means ineffective, substantially as described.

8. In a mechanism of the character described, a gear transmission including a plurality of shiftable gears, a shifting element for each gear, each being provided with an upstanding ear, a pair of rods slidably mounted adjacent the gears on which the shifting elements are slidably mounted, means for simultaneously reciprocating said rods in opposite directions, members fixed one on each rod and movable toward each other to engage against said shifting elements on the first reciprocatory movement of said rods to thereby bring both shifting elements to central neutral position, two dogs pivotally mounted on each ear of the shifting elements and extending in opposite directions, means on each member normally extending under and elevating adjacent dogs, means to selectively depress any desired dog to engage with its associated member when said members have been moved toward each other on the first reciprocatory movement of said rods, and means for holding any dog thus depressed in engagement with its associated member as said member moves to normal position on completion of the reciprocatory movements of said rods.

9. A mechanism as claimed in claim 8 in which said holding means comprises a central vertical plate with lateral extensions located horizontally at each end thereof, the dogs in normal elevated position being stopped from movement by said extensions, but in depressed position being free to pass thereunder, substantially as described.

10. In a mechanism of the character described, a gear transmission including a plurality of shiftable gears, a pair of rods slidably mounted adjacent said gears, a shifting element slidably mounted on each rod and connected each to a shiftable gear, each of said shifting elements having an upstanding ear, means for simultaneously reciprocating said rods in opposite directions, members fixed one to each rod and movable toward each other to engage against said shifting elements on the first reciprocatory movement of said rods to thereby bring both shifting elements to central neutral position, two dogs pivotally mounted on each ear and extending in opposite directions, means on each member normally extending under and elevating adjacent dogs, members, one for each dog pivotally mounted at one end with its opposite end lying against its associated dog, a pivotally mounted bell crank lever for each of said last mentioned members, one arm of the lever bearing against its associated member, a wire connected to each of the other arms of the bell crank levers, and means to impart a pull on the wires, substantially as described.

11. A mechanism containing the elements claimed in combination in claim 10 combined with a housing, a plurality of levers pivotally mounted between their ends and located within the housing, there being a lever for each wire and to one end of each of which a wire is connected, and a selector device for each lever bearing against the opposite end of the lever and slidably mounted in and projecting through the upper side of the housing.

12. Selector mechanism for selective sliding gear transmissions comprising a plurality of wires adapted to be connected with the immediate selective mechanism associated with the gears, a plurality of levers, one for each wire, one end of each lever having a wire connected thereto, a housing for all of the levers, means for pivotally mounting the levers in the housing between the ends thereof, and a manually operated selector device for each lever bearing against the end of the lever opposite to that at which the wire is connected and slidably mounted in and projecting through the upper side of the housing.

13. In a mechanism of the character described, a gear transmission including a plurality of shiftable gears, a pair of rods slidably mounted adjacent the gears, a shifting element slidably mounted on each rod and connected each to a shiftable gear, means for simultaneously reciprocating the rods in opposite directions, members fixed one on each rod and movable toward each other to engage against the shifting elements on the first reciprocatory movement of said rods to thereby bring both shifting elements to central neutral positon, means to selectively connect either shifting element to either of said members, a vertical plate disposed betwen the shifting elements having an opening therethrough, and each shifting element in its side thereof adjacent the plate being provided with a recess, and a ball located in the opening in the plate, said recesses in the shifting elements being positioned to lie directly opposite each other and the opening in the plate when in neutral position, substantially as described.

14. In a mechanism of the character described, a sliding gear transmission including two shiftable gears, a shifting mechanism, selective means to selectively connect the shifting mechanism with the gears to thereby effect the shifting of any shiftable gear in either of two directions, said selective means comprising a plurality of wires forming elements of the selective means, and means whereby any wire is operated by pulling thereon from its opposite ends to effect a desired selection and to return the wire to normal neutral position on the neutralizing of the gearing, respectively, substantially as described.

15. In a mechanism of the character described, a selective mechanism including a plurality of selector wires, a flexible covering for each wire, and a flexible tubular casing inclosing all of the wires and the coverings therefor, substantially as described.

In testimony whereof I affix my signature.

BAYARD E. RICHARDSON.